United States Patent
Yamaji et al.

[11] Patent Number: 6,161,875
[45] Date of Patent: Dec. 19, 2000

[54] FLUID COUPLING

[75] Inventors: Michio Yamaji; Tsutomu Shinohara; Kosuke Yokoyama, all of Osaka, Japan

[73] Assignee: Fujikin Incorporated, Osaka, Japan

[21] Appl. No.: 09/280,014

[22] Filed: Mar. 29, 1999

[30] Foreign Application Priority Data

Mar. 31, 1998 [JP] Japan ................................. 10/085807

[51] Int. Cl.$^7$ ................................................. F16L 35/00
[52] U.S. Cl. ...................... 285/24; 285/124.1; 285/328; 285/379; 285/906; 285/26
[58] Field of Search ................ 285/379, 24, 27, 285/124.1, 328, 906, 26

[56] References Cited

U.S. PATENT DOCUMENTS

| | | | |
|---|---|---|---|
| 3,127,196 | 3/1964 | Fabian et al. | 285/379 |
| 5,011,196 | 4/1991 | Sabatier et al. | 285/379 |
| 5,482,332 | 1/1996 | Ohmi et al. | 285/279 |
| 5,673,946 | 10/1997 | Barber et al. | 285/379 |
| 5,829,796 | 11/1998 | Robinson | 285/379 |

*Primary Examiner*—Dave W. Arola
*Attorney, Agent, or Firm*—Armstrong, Westerman, Hattori, McLeland & Naughton

[57] ABSTRACT

Each of coupling members 5, 12 is formed with a retainer accommodating recessed portion 45, 46 in an butting end face thereof, the recessed portion 45, 46 being formed on a bottom face thereof with a gasket holding annular ridge 47, 48 having an annular projection 47a, 48a. A retainer 42 comprises a retainer body 43 holding the outer periphery of a gasket 41 and attached to the outer periphery of the annular ridge 47 of one of the coupling members, 5, and a guide ring portion 44 for guiding a peripheral surface of the recessed portion 46 of the other coupling member 12 when the two coupling members 5, 12 are butted against each other.

13 Claims, 6 Drawing Sheets

(a)

(b)

(a)

(b)

FLUID COUPLING

BACKGROUND OF THE INVENTION

The present invention relates to fluid couplings, and more particularly to fluid couplings useful for connecting massflow controllers, on-off valves and connecting blocks interposed between these devices in fluid control apparatus for fabricating semiconductors.

Fluid control apparatus for use in fabricating semiconductors comprise controllers, such as massflow controllers for controlling flow rates and pressure regulators for controlling pressure, and on-off valves, etc. in combination with the controllers. The present applicant has already proposed a desirable arrangement wherein a massflow controller is connected to an on-off valve by a suitable connecting block for use in such control apparatus (see JP-A No. 326943/1996). FIG. 6 shows the construction of a fluid coupling disclosed in the proposal.

With reference to FIG. 6, the fluid coupling comprises male and female coupling members 9, 92 having gasket holding annular projections 98, 99 respectively on butting end faces thereof, an annular gasket 93 interposed between the butting end faces of the two coupling members 91, 92, and a retainer 94 holding the outer periphery of the gasket 93 to retain the gasket 93 on the female coupling member 92. Each of the coupling members 91, 92 may be a connecting block, massflow controller body, or block joined to an on-off valve. One of the butting end faces of these coupling members 91, 92 is of the male type, and the other end face is of the female type. A fitting raised portion 95 formed on the butting end face of the male coupling member 91 and projecting axially thereof is fitted in a fitting recessed portion 96 formed in the butting end face of the female coupling member 92, whereby the coupling members 91, 92 are prevented from being displaced from each other radially thereof. A retainer holding cylindrical portion 97 is formed on the butting end face of the female coupling member 92. The retainer 94 holds the cylindrical portion 97, whereby the gasket 93 is retained on the female coupling member 92.

The conventional fluid coupling comprises two kinds of coupling members, i.e., the male type and the female type, so that when to be joined to each other, these members need to be distinguished with respect to the joining direction and therefore require much time and labor for joining. Moreover, when the joining direction is to be reversed, there arises the problem of necessitating other coupling members which are reversed in male-female relationship.

If the difference of being male and female is eliminated, the effect to prevent the axial displacement by fitting is no longer available, and the gasket holding annular projection 98 of the coupling member 91 which is not held by the retainer 94 becomes liable to shift radially relative to the gasket 93. This entails the problem that the projection 98 becomes released from the end face of the gasket 93 to result in impaired fluid tightness.

SUMMARY OF THE INVENTION

An object of the present invention is to provide a fluid coupling comprising coupling members without the distinction of male and female and prevented from becoming impaired in fluid tightness owing to displacement.

The present invention provides a fluid coupling comprising first and second coupling members respectively having fluid channels communicating with each other, an annular gasket interposed between butting end faces of the two coupling members, and a retainer for holding the gasket, the fluid coupling being characterized in that each of the coupling members is formed with a retainer accommodating recessed portion in the butting end face thereof, the recessed portion being formed on a bottom face thereof with a gasket holding annular ridge having an annular projection, the retainer comprising a retainer body holding an outer periphery of the gasket and attached to an outer periphery of the annular ridge of one of the coupling members, and a guide ring portion for guiding a peripheral surface of the recessed portion of the other coupling member when the two coupling members are butted against each other.

The retainer body and the guide ring portion may be separate members or integral.

With the fluid coupling of the present invention, either one of the first and second coupling members can be held by the retainer, so that the coupling members can be joined without distinction between the male type and the female type of the butting end faces of the coupling members. Further since the retainer has the guide ring portion for guiding the peripheral surface of the recessed portion of the coupling member to which the retainer is not attached when the two coupling members are butted against each other, the radial displacement of one of the coupling members relative to the other coupling member can be diminished.

DESCRIPTION OF THE PREFERRED EMBODIMENTS

Embodiments of the invention will be described below with reference to the drawings.

Figure 2:
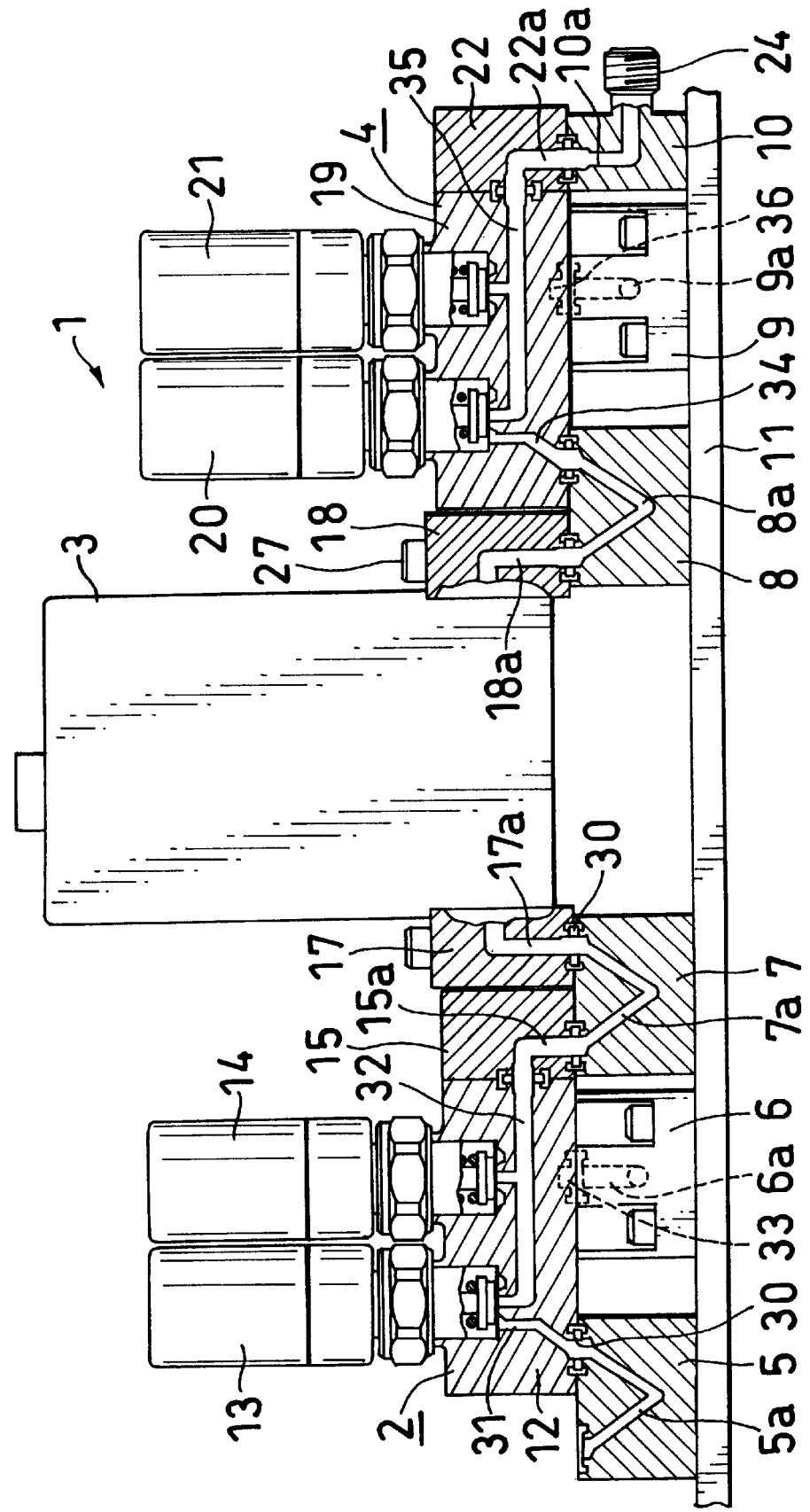
FIG. 2 is a view in longitudinal section of the control apparatus shown in FIG. 1.

The terms "upper," "lower," "left" and "right" as used herein refer respectively to the upper and lower sides, and the left-hand and right-hand sides of FIG. 2. The terms "front" refers to the front side of the plane of the same drawing, and the term "rear" to the rear side thereof. The terms upper and lower are used for convenience sake; the apparatus shown may be used as turned upside down or as laid on its side.

Figure 1:
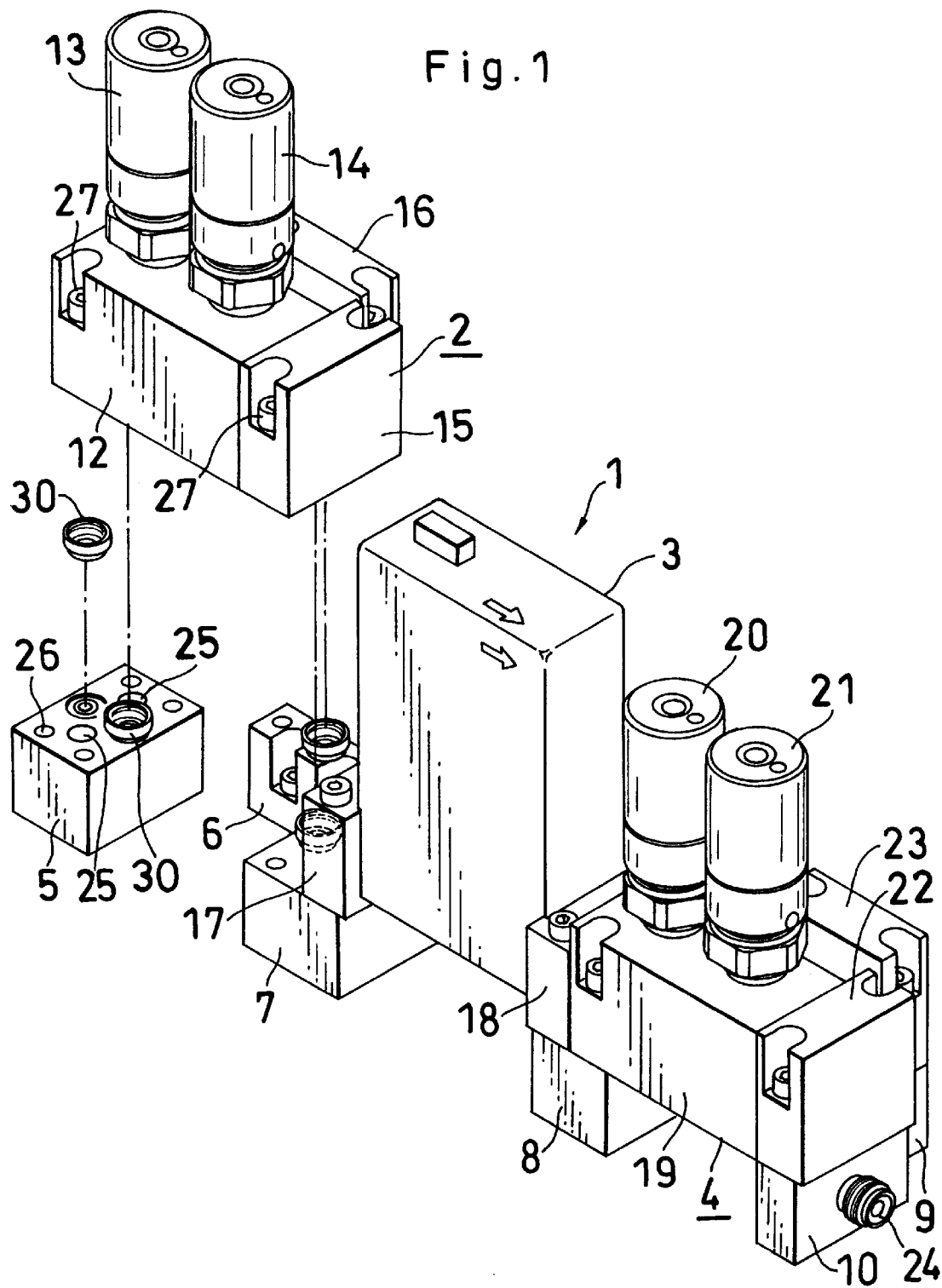
FIG. 1 is an exploded perspective view of a fluid control apparatus wherein fluid couplings of the invention are used.

FIGS. 1 and 2 show part of a fluid control apparatus 1 wherein fluid couplings of the invention are used. The apparatus 1 comprises a plurality of block couplings 5, 6, 7, 8, 9, 10 mounted on a base plate 11, and different kinds of fluid controllers 2, 3, 4 mounted on the couplings 5 to 10.

The fluid controllers 2, 3, 4 are a first block valve 2, massflow controller (controller) 3 and second block valve 4 as arranged from the left rightward. The block couplings 5 to 10 are, as arranged from the left rightward, a block coupling 5 formed with a first V-shaped channel 5a having a left upward opening and a right upward opening, a block coupling 6 formed with a first L-shaped channel 6a having an upward opening and a rearward opening, a block coupling 7 formed with a second V-shaped channel 7a having a left upward opening and a right upward opening, a block coupling 8 formed with a third V-shaped channel 8a having a left upward opening and a right upward opening, a block coupling 9 formed with a second L-shaped channel 9a having an upward opening and a rearward opening, and a block coupling 10 formed with a third L-shaped channel 10a having an upward opening and a rightward opening.

The block couplings 5 to 10 are formed at predetermined portions with through holes 25 and screw bores 26, and bolts (not shown) inserted through the holes 25 are driven into screw bores (not shown) in the base plate 11, whereby the couplings are fastened to the base plate 11. Bolts 27 inserted through the fluid controllers 2, 3, 4 from above are driven into the screw bores 26 in the block couplings 5, 6, 7, 8, 9, 10, whereby the controllers are fastened to the corresponding block couplings 5 to 10.

The first block valve 2 comprises a rectangular parallelepipedal blocklike body 12 which is elongated longitudinally of the apparatus, a first actuator 13 and a second actuator 14 which are mounted on the top of the body 12, a right block 15 having an inverted L-shaped channel 15a and attached to the right side of the body 12, and a rear block 16 having an inverted L-shaped channel (not shown) and attached to the rear side of the body 12. The left end portion of the body 12 is attached to the right half of the block coupling 5 having the first V-shaped channel 5a, the right block 15 to the left half of the block coupling 7 having the second V-shaped channel 7a, and the rear block 16 to the lock coupling 6 having the first L-shaped channel 6a.

The body 12 of the first block valve 2 is formed with a first inflow channel 31 having a downward opening at its left end portion and communicating with the right opening of the block coupling 5 having the first V-shaped channel 5a, an outflow channel 32 communicating with the first inflow channel 31 via the first actuator 13 and in communication with a rightward channel portion of the inverted L-shaped channel 15a of the right block 15, and a downward second inflow channel 33 communicating with the outflow channel 32 via the second actuator 14 and communicating with the upward opening of the block coupling 6 having the first L-shaped channel 6a. The inverted L-shaped channel 15a of the right block 15 has a downward channel portion communicating with the left opening of the block coupling 7 having the second V-shaped channel 7a.

Provided at the lower end portion of left side of the controller 3 is a left block 17 projecting leftward from the left side and having an inverted L-shaped channel 17a in communication with an inflow channel (not shown) of the controller 3. Provided at the lower end portion of right side of the controller 3 is a right block 18 projecting rightward from the right side and having an inverted L-shaped channel 18a in communication with an outflow channel (not shown) of the controller 3. The left block 17 is mounted on the right half of the block coupling 7 having the second V-shaped channel 7a, whereby the inverted L-shaped channel 17a of the left block 17 is caused to communicate with the inverted L-shaped channel 15a of the right block 15 of the first block valve 2 by the block coupling 7 having the second V-shaped channel 7a. The right block 18 of the controller 3 is mounted on the left half of the block coupling 8 having the third V-shaped channel 8a.

The second block valve 4 comprises a rectangular parallelepipedal blocklike body 19 which is elongated longitudinally of the apparatus, a third actuator 20 and a fourth actuator 21 which are mounted on the top of the body 19, a right block 22 having an inverted L-shaped channel 22a and attached to the right side of the body 19, and a rear block 23 having an inverted L-shaped channel and attached to the rear side of the body 19. The left end portion of the body 19 is mounted on the right half of the block coupling 8 having the third V-shaped channel 8a, the right block 22 on the block coupling 10 having the third L-shaped channel 10a, and the rear block 23 on the block coupling 9 having the second L-shaped channel 9a. A fluid outlet 24 is provided at the rightward opening of the block coupling 10 having the third L-shaped channel 10a.

The body 19 of the second block valve 4 is formed with an inflow channel 34 having a downward opening at its left end portion and communicating with the right opening of the block coupling 8 having the third V-shaped channel 8a, a first outflow channel 35 communicating with the inflow channel 34 via the third actuator 20 and in communication with a rightward channel portion of the inverted L-shaped channel 22a of the right block 22, and a downward second outflow channel 36 communicating with the first outflow channel 35 via the fourth actuator 21 and communicating with the upward opening of the block coupling 9 having the second L-shaped channel 9a. The right block 22 having the inverted L-shaped channel 22a and included in the second block valve 4 communicates with the block coupling 10 having the third L-shaped channel 10a.

A fluid coupling 30 of the invention is provided at each of the joints between the opposed portions of the members 5, 2, 6, 15, 7, 17, 18, 8, 4, 9, 22, 10.

Figure 3:
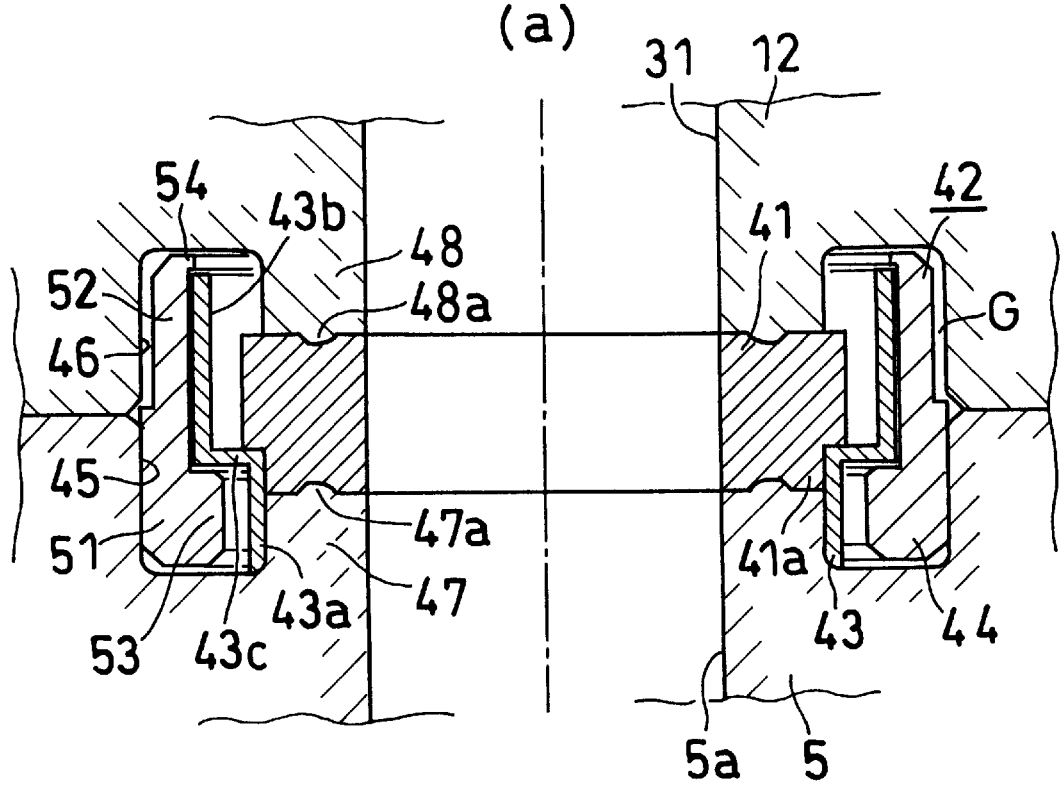
FIG. 3 is an enlarged view in section of a first embodiment fluid coupling.
Figure 3:
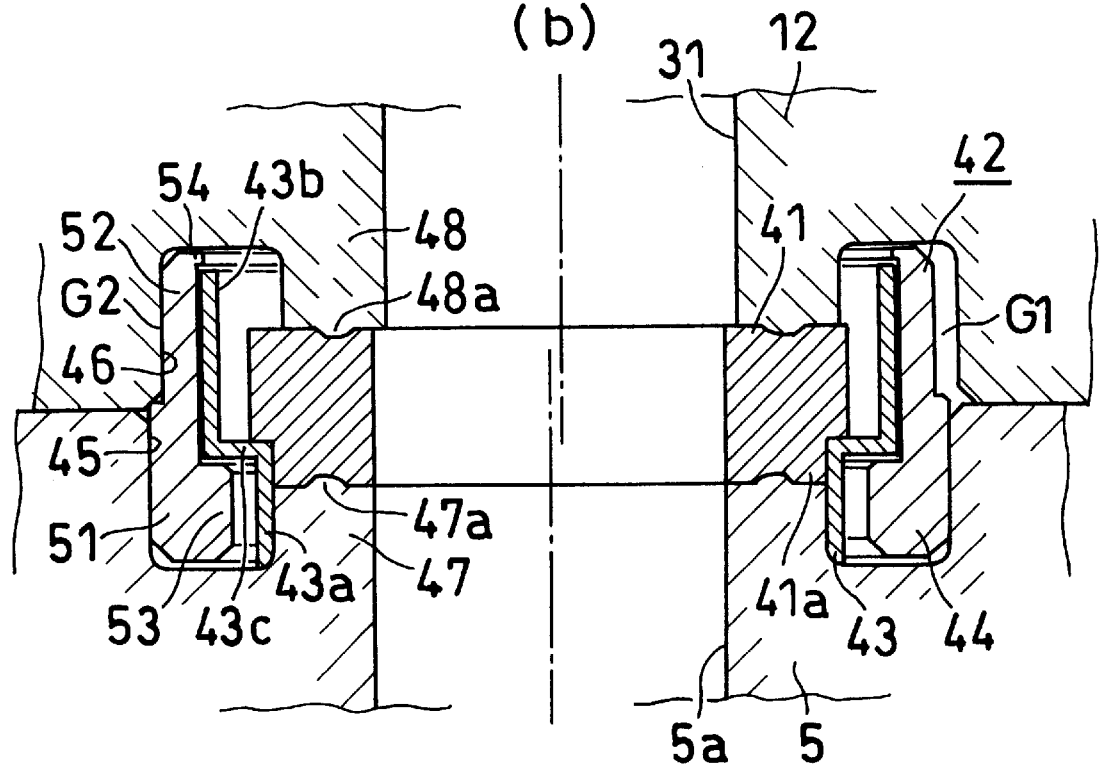

With reference to FIG. 3, a first embodiment of fluid coupling of the invention will be described which is provided between the block coupling 5 (hereinafter referred to as the "first coupling member") having the first V-shaped channel 5a and the body 12 (hereinafter referred to as the "second coupling member") of the first block valve 2.

The fluid coupling serves to fluid-tightly join the first coupling member 5 having the first channel 5a to the second coupling member 12 having the second channel 31 in communication with the first channel 5a. The coupling comprises these two coupling members 5, 12, an annular gasket 41 interposed between butting end faces of the coupling members 5, 12, a retainer 42 comprising a retainer body 43 holding the gasket 41 and causing the first coupling member 5 to hold the gasket thereto in the illustrated embodiment and a guide ring 44 attached to the outer side of the retainer body 43, and threaded means for connecting the two coupling members 5, 12 together.

Retainer accommodating annular recessed portions 45, 46 surrounding the openings of the fluid channels 5a, 31 are formed in the respective butting end faces of the first and second coupling members 5, 12. The recessed portions 45, 46 are formed on their bottom faces with gasket holding annular ridges 47, 48 having annular projections 47a, 48a. The recessed portions 45, 46, annular projections 47a, 48a and annular ridges 47, 48 are concentric with one another. The outer end faces of the annular ridges 47, 48 are recessed from the butting end faces by a distance slightly smaller than one half of the thickness of the gasket 41. The annular projection 47a (48a) is provided at the approximate radial midportion of the outer end face of the annular ridge 47 (48). The first and second coupling members 5 and 12 are identical in the shape of the recessed portions 45, 46, as well as of the annular ridges 47, 48.

The gasket 41 is made of stainless steel, has an inside diameter equal to the diameter of the channels of the two coupling members 5, 12 and is slightly larger than the gasket holding annular ridges 47, 48 in outside diameter. The portion 41a of the gasket 41 to be in contact with the first coupling member 5 has a reduced diameter equal to the outside diameter of the ridges 47, 48.

The retainer body 43 is in the form of an integral stainless steel plate and comprises a small-diameter portion 43a having an inside diameter equal to the outside diameter of the gasket reduced-diameter portion 41a, a large-diameter portion 43b having a greater diameter than the portion 43a, and a connecting portion 43c connecting one end of the small-diameter portion 43a to one end of the large-diameter portion 43b. The stainless steel plate is thin, and the small- and large-diameter portions 43a, 43b each have slight resiliency radially thereof. The connected part of the small-diameter portion 43a is fitted around the gasket reduced-diameter portion 41a, and the remaining part of the portion 43a around the outer periphery of the annular ridge 47 of the first coupling member 5. The large-diameter portion 43b is so dimensioned as to be spaced apart from the outer periphery of the gasket 41, as well as from the peripheries of the recessed portions 45, 46, by a clearance.

The guide ring 44, which is made of stainless steel, comprises a fitting portion 51 having an outside diameter approximately equal to the diameter of periphery of the recessed portion 45 of the first coupling member 5 and fitted in the recessed portion 45, and a guide portion 52 having an outside diameter slightly smaller than the diameter of periphery of the recessed portion 46 of the second coupling member 12 and loosely fitted in the recessed portion 46. The guide portion 52 has an inside diameter approximately equal to the outside diameter of the large-diameter portion 43b of the retainer body 43. The fitting portion 51 has an inner peripheral upper part flush with the inner peripheral surface of the guide portion 51 and an inner peripheral lower part which is in the form of an annular inward protuberance 53 in bearing contact with the radially outward part of connecting portion 43c of the retainer body 43 from therebelow. The guide portion 52 is formed at its upper end with a small annular protrusion 54 bearing on the upper end of large-diameter portion 43b of the retainer body 43 from above. The entire vertical width of the retainer body 43, as well as of the guide ring 44, is slightly smaller than the combined depth of the recessed portion 45 of the first coupling member 5 and the recessed portion 46 of the second coupling member 12.

According to the present embodiment, the retainer body 43 and the guide ring 44 are formed separately. The retainer body 43 is fitted into the guide ring 44 from above, whereby the two components 43, 44 are combined into the retainer 42. With the gasket 41 further fitted in the retainer body 43 of the retainer 42, the retainer 42 and the gasket 41 are held by the first coupling member 5, whereby the gasket 41 is positioned in place. The second coupling member 12 is butted against the first coupling member 5, with the retainer 42 and the gasket 41 held to the member 5. At this time, the second coupling member 12 is guided by the guide portion 52 of the guide ring 44.

FIG. 3, (a) shows the second coupling member 12 as properly butted against the first coupling member 5. In this state, the outer peripheral surface of guide portion 52 of the guide ring 44 is spaced apart from the peripheral surface of the recessed portion 46 of the second coupling member 12 by a clearance G of 0.15 mm at any position. In the recessed portion 45 of the first coupling member 5, the fitting portion 51 of the guide ring 44 is fitted to the peripheral surface of the recessed portion 45, with the small-diameter portion 43a of the retainer body 43 fitting to the outer periphery of the annular ridge 47. This eliminates the likelihood of the retainer 42 and the gasket 41 moving radially. FIG. 3, (b) shows the second coupling member 12 butting against the first coupling member 5 is radially displaced from the member 5 to the greatest extent. Stated more specifically, the outer peripheral surface of guide portion 52 of the guide ring 44 is spaced apart from the peripheral surface of the recessed portion 46 of the second coupling member 12 by a clearance G1 of 0.3 mm at a position, while the clearance G2 between the opposed surfaces is zero at a position spaced from this position by 180 degrees about the center. However, the annular projection 48a in pressing contact with the gasket 41 under great pressure is provided at the approximate radial midportion of the outer end face of the annular ridge 48 and therefore will not become released from the gasket 41 in the event of such displacement. Thus, the coupling is free of any problems such as impaired fluid tightness. In the state of the greatest displacement, the distance between the inner periphery of the annular projection 48a and the inner periphery of the gasket 41 is, for example, 0.56 mm at one side and 0.26 mm at the other side.

In the case of the fluid coupling described, the retainer 42 can be held by either one of the first and second coupling members 5, 12, so that in assembling the fluid control apparatus 1 shown in FIGS. 1 and 2, the components 2, 4, 5, 6, 7, 8, 9, 10, 15, 17, 18, 22 can be joined one after another without distinction between the male type and the female type of the butting end faces. The second coupling member 12 can be butted against the first coupling member 5 while being guided by the guide portion 52 of the guide ring 44. This assures facilitated assembly while permitting the second coupling member 12 to move radially relative to the first coupling member 5 by only a greatly reduced amount. Although the gasket 41 is deformed most greatly at the position where the annular projections 47a, 48a are brought into contact with the gasket, this position is not the inner peripheral portion of the gasket end face but outwardly away from the inner periphery, so that the gasket portion deforming most markedly is outwardly of the inner peripheral portion. This obviates the likelihood of the inner peripheral portion of the gasket 41 creasing, preventing deposition of dust.

Figure 4:
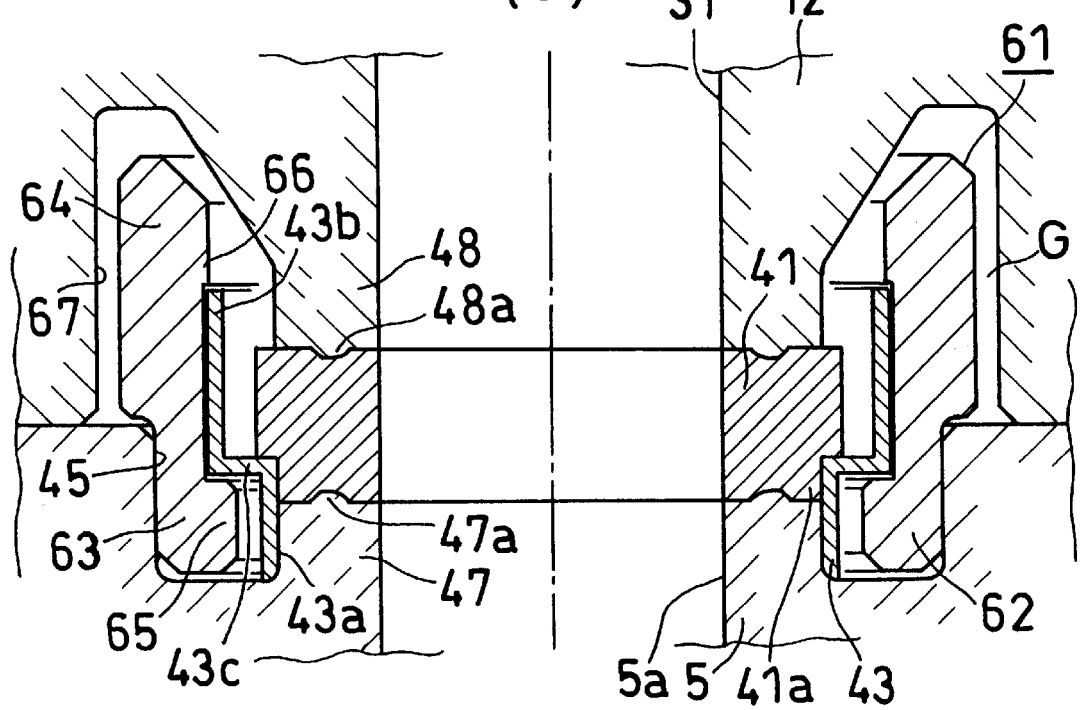
FIG. 4 an enlarged view in section of a second embodiment of fluid coupling.
Figure 4:
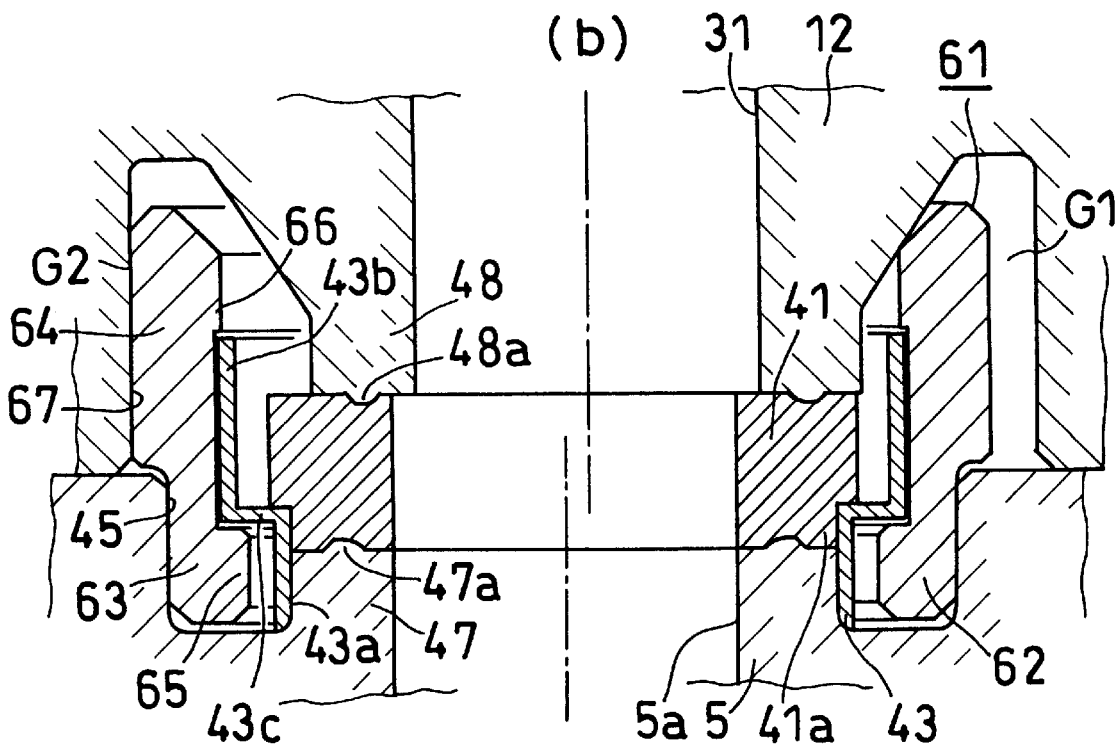

FIG. 4 shows a second embodiment of fluid coupling of the invention, which differs from the first embodiment in the construction of a guide ring 62 of a retainer 61 and the construction of a retainer accommodating recessed portion 67 of the second coupling member. With the exception of these features, the second embodiment has the same construction as the first. Throughout the drawings concerned, therefore, like parts are designated by like reference numerals or symbols and will not be described repeatedly.

The guide ring 62 of the retainer 61 according to the second embodiment is made of stainless steel and comprises a fitting portion 63 having an outside diameter approximately equal to the diameter of periphery of the recessed portion 45 of the first coupling member 5 and fitted in the recessed portion 45, and a guide portion 64 having an outside diameter slightly smaller than the diameter of periphery of the recessed portion 67 of the second coupling member 12 and loosely fitted in the recessed portion 67.

As shown in FIG. 4, the retainer accommodating recessed portion 67 of the second coupling member 12 is greater than the recessed portion 45 of the first coupling member 5 in diameter and also in depth.

The guide portion 64 has an inside diameter approximately equal to the outside diameter of the large-diameter portion 43b of the retainer body 43, and is greater than the fitting portion 63 in outside diameter. The fitting portion 63 has an inner peripheral upper part flush with the inner peripheral surface of the guide portion 64 and an inner peripheral lower part which is in the form of an annular inward protuberance 65 in bearing contact with the radially outward part of connecting portion 43c of the retainer body 43 from therebelow. The guide portion 64 is formed at its upper end with an annular protrusion 66 bearing on the upper end of large-diameter poriton 43b of the retainer body 43 from above. The protrusion 66 at the upper end of the guide portion 64 has such a small height as will not interfere with the guide ring 62 when the ring is fitted into the retainer body 43. The entire vertical width of the guide ring 62 is slightly smaller than the combined depth of the recessed portion 45 of the first coupling member 5 and the recessed portion 67 of the second coupling member 12.

FIG. 4, (a) shows the second coupling member 12 as properly butted against the first coupling member 5. In this state, the outer peripheral surface of guide portion 64 of the guide ring 62 is spaced apart from the peripheral surface of the recessed portion 67 of the second coupling member 12 by a clearance G of 0.25 mm at any position. In the recessed portion 45 of the first coupling member 5, the fitting portion 63 of the guide ring 62 is fitted to the peripheral surface of the recessed portion 45, with the small-diameter portion 43a of the retainer body 43 fitting to the outer periphery of the annular ridge 47. This eliminates the likelihood of the retainer 61 and the gasket 41 moving radially. FIG. 4, (b) shows the second coupling member 12 butting against the first coupling member 5 is radially displaced from the member 5 to the greatest extent. Stated more specifically, the outer peripheral surface of guide portion 64 of the guide ring 62 is spaced apart from the peripheral surface of the recessed portion 67 of the second coupling member 12 by a clearance G1 of 0.5 mm at a position, while the clearance G2 between the opposed surfaces is zero at a position spaced from this position by 180 degrees about the center. However, the annular projection 48a in pressing contact with the gasket 41 under great pressure is provided at the approximate radial midportion of the outer end face of the annular ridge 48 and therefore will not become released from the gasket 41 in the event of such displacement. Thus, the coupling is free of any problems such as impaired fluid tightness. In the state of the greatest displacement, the distance between the inner periphery of the annular projection 48a and the inner periphery of the gasket 41 is, for example, 0.65 mm at one side and 0.15 mm at the other side.

The coupling of the second embodiment differs from that of the first in that the retainer 1 can be held by the first coupling member 5 only, and that the guide ring 62 is enlarged both radially and axially thereof, and has the advantage that the guide ring 62 is improved in rigidity.

Figure 5:
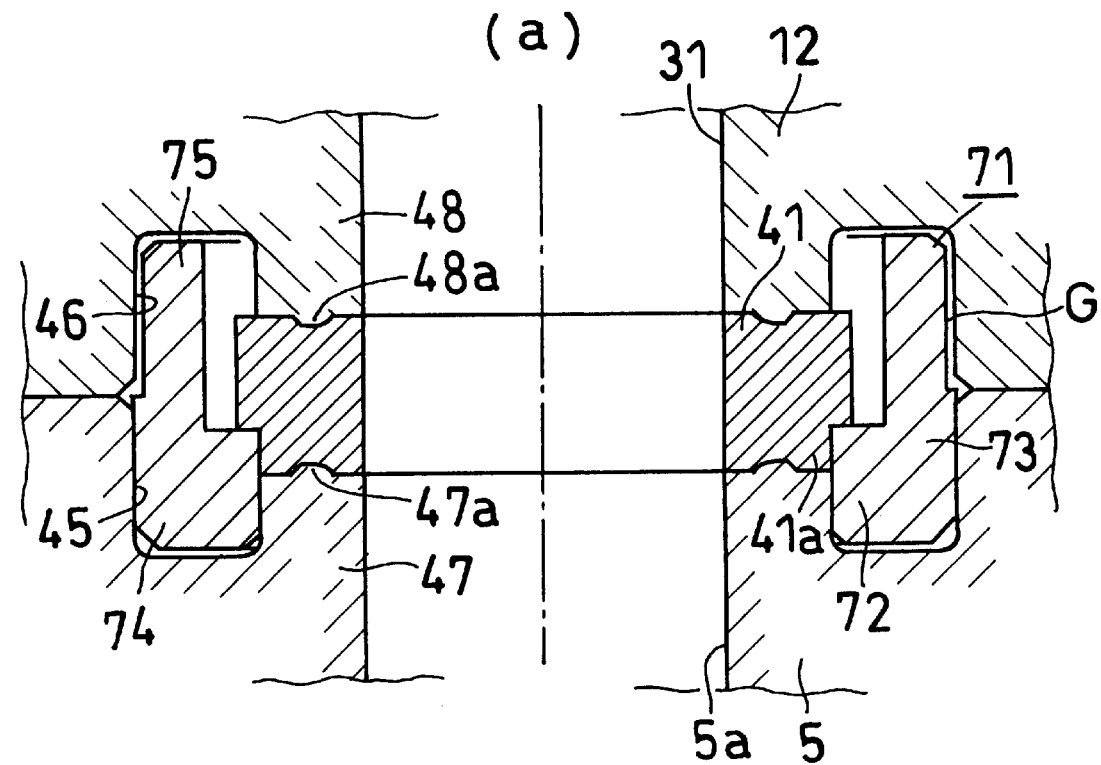
FIG. 5 is an enlarged view in section of a third embodiment of fluid coupling.
Figure 5:
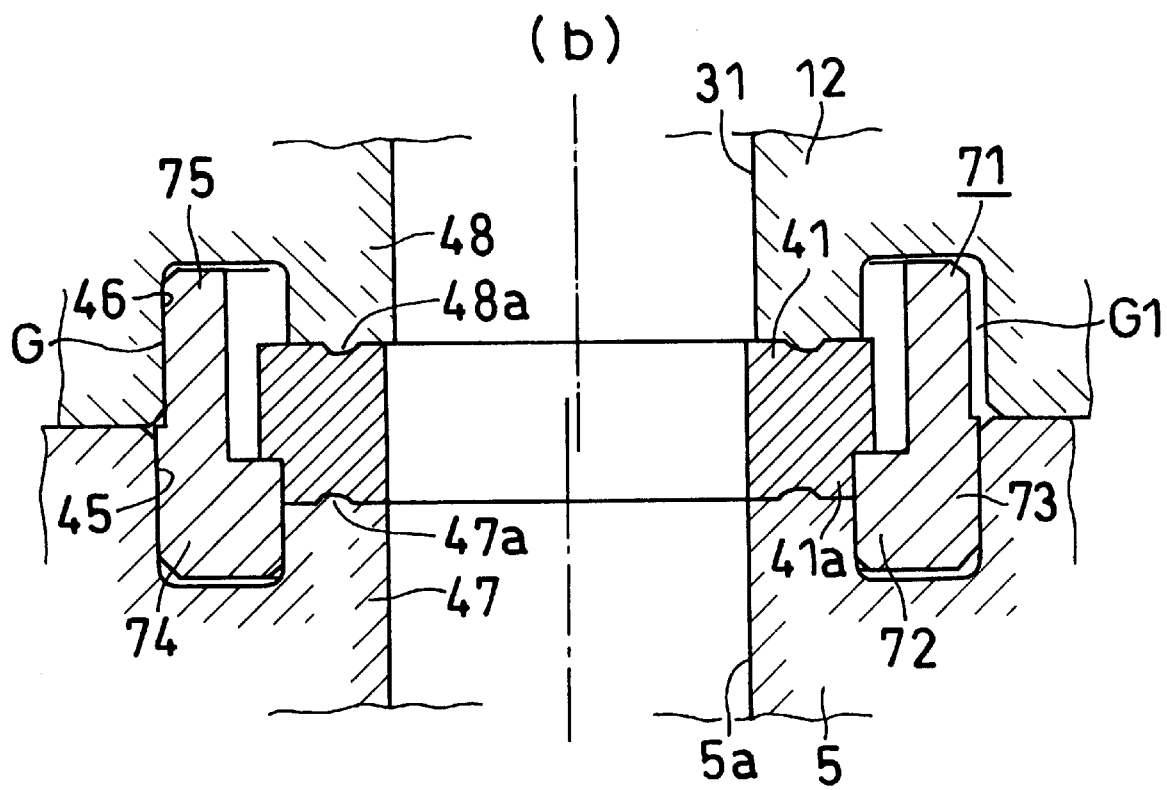
Figure 6:
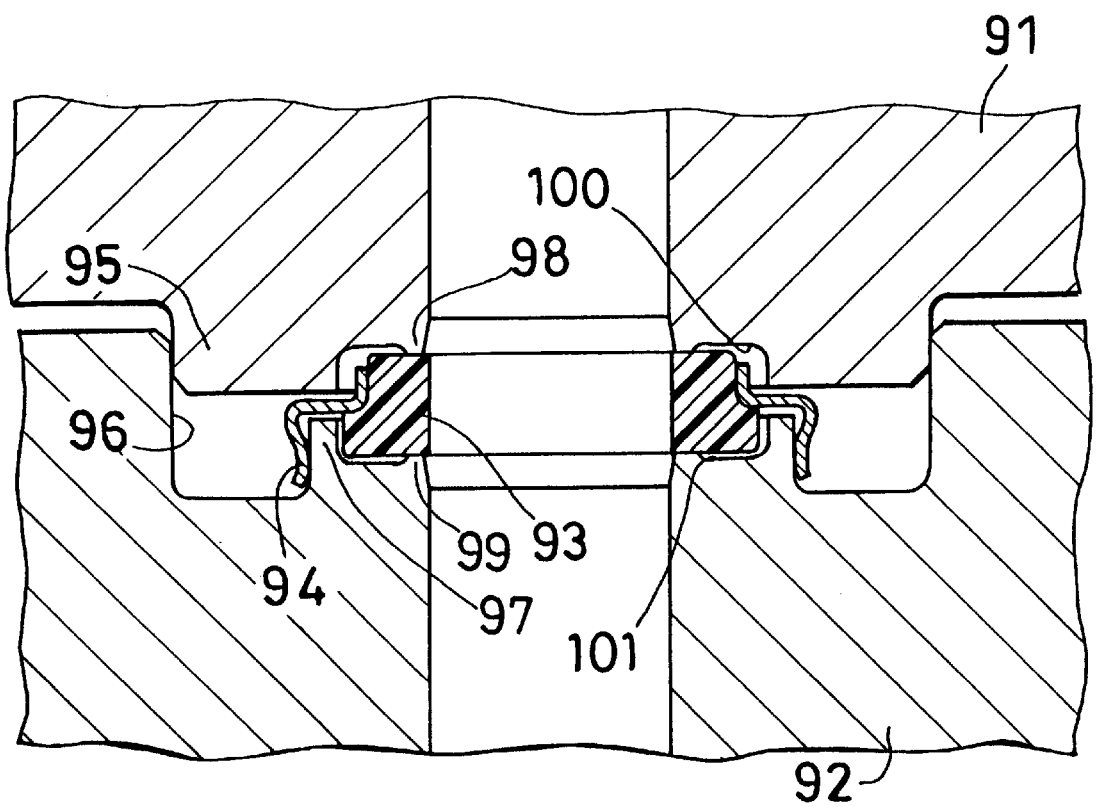
FIG. 6 is a sectional view of a conventional fluid coupling.

FIG. 5 shows a third embodiment of fluid coupling of the invention. This fluid coupling is different from the coupling of the first embodiment only in the construction of a retainer 71. With the exception of this feature, the third embodiment has the same construction as the first. Throughout the drawings concerned, like parts are designated by like reference numerals or symbols and will not be described repeatedly.

The retainer 71 of the third embodiment comprises a retainer body portion 72 and a guide ring portion 73 which are made integrally from stainless steel.

The retainer body portion 72 has an inside diameter equal to the outside diameter of the gasket reduced-diameter portion 41a, holds the outer periphery of the reduced-diameter portion 41a and is attached to the outer periphery of the annular ridge 47 of the first coupling member 5. The guide ring portion 73 comprises a fitting portion 74 integral with the outer periphery of the retainer body portion 72, having an outside diameter approximately equal to the diameter of peripheral surface of the recessed portion 45 of the first coupling member 5 and fitted in the recessed portion 45, and a guide portion 75 having an outside diameter slightly smaller than the diameter of periphery surface of the second coupling member recessed portion 46 and loosely fitted in the recessed portion 46.

The guide portion 75 has an inside diameter larger than the outside diameter of the gasket 41. The entire vertical width of the guide ring portion 73 is slightly smaller than the combined depth of the recessed portion 45 of the first coupling member 5 and the recessed portion 46 of the second coupling member 12.

FIG. 5, (a) shows the second coupling member 12 as properly butted against the first coupling member 5. In this state, the outer peripheral surface of guide portion 75 of the guide ring portion 73 is spaced apart from the peripheral surface of the recessed portion 46 of the second coupling member 12 by a clearance G of 0.25 mm at any position. In the recessed portion 45 of the first coupling member 5, the fitting portion 74 of the guide ring portion 73 is fitted to the peripheral surface of the recessed portion 45, with the retainer body portion 72 fitting to the outer periphery of the annular ridge 47. This eliminates the likelihood of the retainer 71 and the gasket 41 moving radially. FIG. 5, (b) shows the second coupling member 12 butting against the first coupling member 5 is radially displaced from the member 5 to the greatest extent. Stated more specifically, the outer peripheral surface of guide portion 75 of the guide ring portion 73 is spaced apart from the peripheral surface of the recessed portion 46 of the second coupling member 12 by a clearance Gl of 0.3 mm at a position, while the clearance G2 between the opposed surfaces is zero at a position spaced from this position by 180 degrees about the center. However, the annular projection 48a in pressing contact with the gasket 41 under great pressure is provided at the approximate radial midportion of the outer end face of the annular ridge 48 and therefore will not become released from the gasket 41 in the event of such displacement. Thus, the coupling is free of any problems such as impaired fluid tightness. In the state of the greatest displacement, the distance between the inner periphery of the annular projection 48a and the inner periphery of the gasket 41 is, for example, 0.56 mm at one side and 0.26 mm at the other side.

The coupling of the third embodiment differs from the first in that the retainer body portion 72 is integral with the guide ring portion 73, and has the advantage that the fluid coupling can be prepared from a reduced number of components without necessitating the work of fitting the guide ring into the retainer body. On the other hand, the coupling of the first embodiment has the advantage of permitting fine adjustment of the specifications, such that the guide ring 44 can be prepared from a material which needs to have strength, with the retainer body 43 prepared from a material with which resiliency is of importance.

What is claimed is:

1. A fluid coupling comprising:
   a first coupling member with a fluid channel further having,
   a first retainer accommodating recessed portion in a face for abutting a second coupling member, and
   a gasket holding annular ridge in the recessed portion having an annular projection;

the second coupling member with a fluid channel positioned to communicate with the fluid channel in the first fluid coupling member, the second coupling member further having,
  a second retainer accommodating recessed portion in a face for abutting the first coupling member,
  a gasket holding annular ridge in the recessed portion having an annular projection;
an annular gasket interposed between abutting end faces of the first and the second coupling members; and
a retainer for holding the gasket further having,
  a retainer body associating with both an outer periphery of the gasket and an outer periphery of the annular ridge of one of the first and second coupling members, and
  a guide ring portion for guiding the recessed portions of the first and second coupling members together when the first and second coupling members abut and means for retaining said first and second coupling members in abutment.

2. The fluid coupling of claim 1, wherein the retainer body and the guide ring portion are separate members.

3. The fluid coupling of claim 1, wherein the retainer is a unitary piece.

4. The fluid coupling of claim 3, wherein the retainer is made of stainless steel.

5. The fluid coupling of claim 1, wherein the annular ridges and the annular projections of the first and second coupling members are concentric with one another.

6. The fluid coupling of claim 1, wherein the annular projection is located at the approximate radial midportion of the annular ridge of the first and second coupling member.

7. The fluid coupling of claim 1, wherein the recessed portions and the annular ridges of the first and second coupling members are identical in shape.

8. The fluid coupling of claim 1, wherein the gasket is make of stainless steel and has an orifice with a diameter equal to the diameter of the fluid channels of the first and second coupling members.

9. The fluid coupling of claim 1, wherein a portion of the gasket in contact with the retainer body has a has a reduced diameter equal to the outside diameter of the annular ridges.

10. The fluid coupling of claim 1, wherein the retainer body is an integral stainless steel plate further comprising,
  a small-diameter portion having an outside diameter equal to an outside diameter of the annular ridge of the coupling member which the retainer body contacts,
  a large-diameter portion having a larger diameter than the small-diameter portion, and
  a connecting portion connecting the small-diameter portion to the large-diameter portion.

11. The fluid coupling of claim 1, wherein the guide ring is made of stainless steel and further comprises,
  a fitting portion having an outside diameter approximately equal to the diameter of the recessed portion of one coupling member, and
  a guide portion having an outside diameter smaller than the diameter of the recessed portion of one coupling member.

12. The fluid coupling of claim 11, wherein an annular protrusion is formed on the upper end of the guide portion of the guide ring.

13. A fluid coupling comprising:
  a first coupling member with a fluid channel further having,
    a first retainer accommodating recessed portion in a face for abutting a second coupling member, the recessed portion being recessed a distance extending to an outside diameter of the recessed portion, and
    a gasket holding annular ridge in the recessed portion having an annular projection;
  the second coupling member with a fluid channel positioned to communicate with the fluid channel in the first fluid coupling member, the second coupling member further having,
    a second retainer accommodating recessed portion in a face for abutting the first coupling member, the recessed portion recessed a distance extending to an outside diameter of the recessed portion with the diameter of the recessed portion of the second coupling member being less than the diameter of the recessed portion of the first coupling member;
    a gasket holding annular ridge in the recessed portion having an annular projection;
  an annular gasket interposed between abutting end faces of the first and the second coupling members; and
  a retainer for holding the gasket further having,
    a retainer body associating with both an outer periphery of the gasket and an outer periphery of the annular ridge of one of the first and second coupling members, and
    a guide ring portion for guiding the recessed portions of the first and second coupling members together when the first and second coupling members abut, the guide ring portion having a section in the first coupling member extending a distance beyond the diameter of the recessed portion of the second coupling member and means for retaining said first and second coupling members in abutment.

* * * * *